Jan. 29, 1946.    G. A. CHOTT    2,393,751
METHOD OF MAKING DENTAL POLISHING TOOL
Filed Oct. 14, 1942
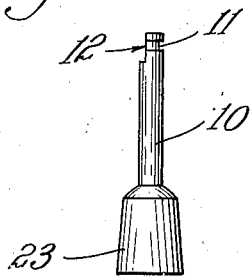
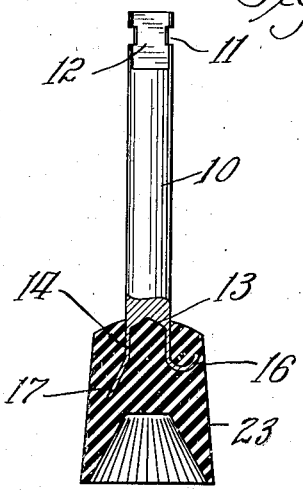
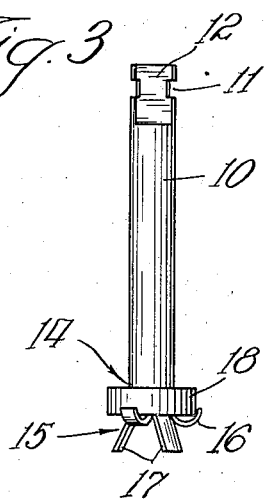
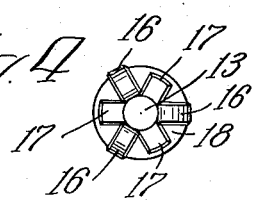
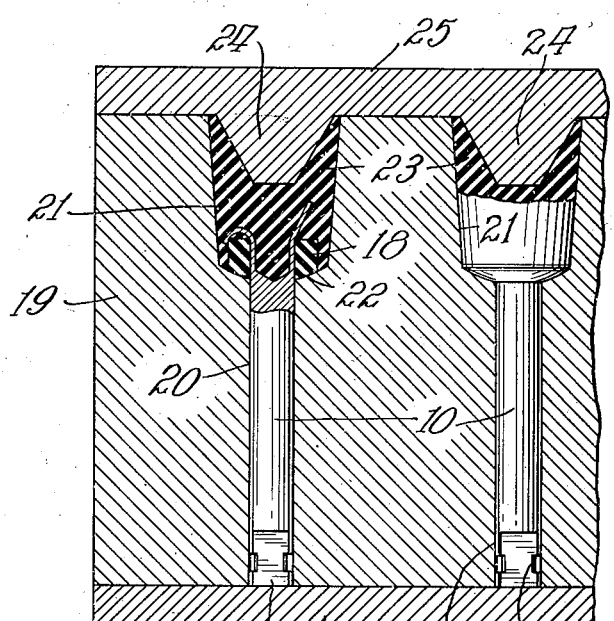
Inventor:
George A. Chott
By Joshua R. H. Potts
his Attorney Patented Jan. 29, 1946

2,393,751

UNITED STATES PATENT OFFICE 2,393,751

METHOD OF MAKING DENTAL POLISHING TOOLS

George A. Chott, Chicago, Ill., assignor of one-half to Hugo J. Chott, Riverside, Ill.

Application October 14, 1942, Serial No. 461,929

7 Claims. (Cl. 18—59)

This invention relates to method of making dental tools or instruments, and more particularly to making what is known as a dental polishing cup which embodies a shank having one end adapted to fit the hand piece of the dentist's instrument or engine, and the other end of which carries a rubber cup adapted to be dipped into and hold a quantity of dentifrice or tooth powder and which is held against the teeth, especially while driven or rotated at high speed in cleaning and polishing the teeth.

Heretofore, as shown in the patents to Edward L. Chott, Nos. 1,644,465 of October 4, 1927, and 2,093,006 of September 14, 1937, it was common to mount the cup on the shank by providing a central bore in one end thereof and splitting the tubular portion thus produced to form tongues some of which were bent back, usually alternate ones, to form an anchoring means for the elastic or soft rubber cup which was mounted and compressed in a crude state about said end and shaped so as to form a cavity or cup in the end remote from the body thereof and then vulcanized at the proper temperature and for the required time necessary to leave the rubber soft and elastic, so as to conform to the teeth, cavities and interstices. However, the molding of the cup directly on to one end of the polished metal of the shank even though held by the embedded tongues, failed to produce a firm connection sufficient to prevent the cup from becoming loose and moreover, when the crude rubber was formed, molded and compressed around the shank and then subjected to heat in the vulcanizing process, the rubber would flow down over the shank disposed therebeneath and form a thin sheath of rubber around the shank, while owing to the necessity of accurate fit of the shank and the snug fitting thereof in the socket, clamp or bitstock of the handpiece, it was necessary to remove this surplus rubber vulcanized around the shank before use and removal thereof sometimes resulted in loosening of the cup at the base so as to render the same useless. Also, the embedded anchoring means was none too efficient.

It is therefore an object of the present invention to overcome the above objections and difficulties, and to so mount a partially vulcanized collar on the mandrel, and dispose the collar against the bottom of the mold cavity under pressure in forming the cup and to so secure the cup to the shank in the vulcanizing process that the same will not get loose, and the flow of surplus rubber, fused by the heat of vulcanization, down over the shank will be effectively prevented as the collar seals the joint and removal thereof rendered unnecessary but the cup firmly and positively fastened or securely anchored in position while being used and held even while cleansing and polishing the teeth.

Another object of the invention is to provide a novel formation for the tongues and method of anchoring the cup on the shank consisting primarily in providing an anchoring body around which the rubber is vulcanized in conjunction with the tongues and consisting more particularly of a partially vulcanized rubber washer, ring or collar which is placed on the shank in abutting relation to certain of the tongues and used as a shoulder or stop member against the bottom of the mold cavity over which the crude rubber is molded and compressed and then vulcanized so that during the curing process, the rubber of the cup and of the collar is fused into a single flexible homogeneous mass or joined in molecular union so as to provide a single body which will not get loose but will be securely fastened or anchored to the shank in connection with the tongues so as to withstand the stresses incident to the use thereof when the cup containing the dentifrice or tooth powder is pressed against the teeth and driven at high speed, but which is sufficiently cheap to be discarded after use so that there will be no danger of transferring infection from one patient to another.

Further objects and advantages will appear and be brought out more fully in the following specification, reference being had to the accompanying drawing, in which:

Fig. 1 is a side elevation of a dental tool or instrument made in accordance with the invention.

Fig. 2 is an enlarged central longitudinal section thereof.

Fig. 3 is a similar view of a shank with a collar or washer thereon prior to the formation of the cup thereover.

Fig. 4 is an end elevation of the shank as shown in Fig. 3, and

Fig. 5 is a sectional view of a mold showing the manner of forming and vulcanizing the cup.

Referring more particularly to the drawing in detail, the dental tool or instrument forming a teeth cleaning device, sometimes known as a polishing cup, consists of a shank 10 of polished or nickeled metal usually of brass or bronze or other suitable tough malleable metal, such as German silver having at one end thereof a groove 11 by which the shank may be held in the hand piece, clamp or bitstock of a dental instrument, such as an ordinary dental engine at one end of a flexible shaft which is driven at high speed usually by means of an electric motor. One side of the shank at the groove 11 has a cutaway or flattened portion 12 by which a coupling is made to the shaft to cause the shank to rotate therewith. The other end of the shank is provided with a central counterbore 13 which forms a relatively thin tubular portion or wall 14 which is split longitudinally at a plurality of points as indicated at 15, thus forming a plurality of longitudinal tongues, alternate ones of which are bent substantially at right angles to the axis of the shank and tubular portion but slightly curved backwardly in convex formation toward the grooved and flattened end of the shank as indicated at 16. The other alternate tongues are bent outwardly in slightly divergent relation as indicated at 17 thus forming tongues at two different angles. A shoulder or enlargement 18, preferably in the form of a collar, ring or washer of partially vulcanized crude rubber, is then applied to or slipped on the shank against the tongues 16 which forms a seat to effectively limit the displacement of the collar on the shank. This may be done by inserting the grooved end of the shank into the aperture of the collar and then displacing one relative to the other by means of a suitable template or otherwise, so that the collar will be forced down against the tongues. These collars or rings may be produced by cutting the same from a partially vulcanized rubber tube of the proper size and bore to fit snugly on the shank with sufficient friction to hold the same in position when once forced against the tongues and vulcanized to firmly adhere and be held to the shanks to form a seal therebetween to prevent leakage of rubber between the shank and collar when the cup is vulcanized thereover. After this, the shanks are held in a suitable mold body 19 having bores 20 for receiving the same and a matrix-forming cavity 21 at the top into which the split end of the shank, that is the tongues and collar, project with the collar against the bottom or lower end 22 of the cavity 21 so that the crude rubber of the cup 23 may enter bore 13 and be molded and compressed around, over and under the tongues and around the shank and to provide a thickness of the rubber, or a wall of the same externally of and over the collar as well as radially or peripherally around the same and the tongues. The cup 23 may be provided with a flared cavity as by forming frusto-conical bosses 24 on the top member 25 which enter and compress the crude rubber in the cavities 21 of the mold which is placed on a base plate 26 thus forming the raw or crude rubber combined with sulphur or other material used in vulcanizing into a cup-shaped contact piece completely around the shank and anchoring parts, including over and around the tongues and collar as described. The bosses are of a form necessary to produce the desired inner contour of the cup-shaped contact piece, such as serrated. The mold and crude rubber are then subjected to the required heat for the necessary time duration to properly cure or vulcanize the same, in such a manner as to leave the same elastic and soft and pliable but tough, compression of the crude rubber in the mold serving to give the required density to the rubber to stand up in use. The partially cured or vulcanized rubber of the collar and the crude or unvulcanized rubber of the cups as thus compressed are then subjected to vulcanizing temperature for the required period to cause complete vulcanization necessary to leave the rubber elastic or soft and pliable but tough. This causes the rubber of the collar and the cup to be fused into a homogeneous and consistent mass to form a single soft rubber body which is caused to snugly adhere to and be firmly anchored on the shank and tongues and to completely envelope the same and the collar including the periphery and top radial surface thereof, so that the rubber fills in the space between the mold at the bottom of the cavity and the collar or around the latter. The outside diameter at the base of the cup is therefore larger than the diameter of the washer with a covering entirely over and around the rubber of the washer or collar 18 except where the collar contacts with and is pressed against the bottom wall of the cavity 21. The result is that the collar forms a seal against the bottom 22 of the cavity 21, so that the rubber will not flow or leak down the shank to leave a sheath or coating of surplus rubber to interfere with the proper accurate fit of the shank in the hand piece or necessitate removal thereof, usually with some difficulty or result in loosening of the cup, thus avoiding the difficulties heretofore encountered and the objections to dental polishing cups or tools as heretofore made.

When the device is used, the cup is dipped into and holds a quantity of dentifrice or tooth powder, especially by reason of the serrated inner surface of a cup and is held against the teeth especially while driven at high speed in cleansing and polishing.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The method of producing dental tools having cups of flexible rubber as described having a mandrel with a tubular shank, consisting in splitting and bending tongues from the shank mounting a partially vulcanized enlargement on the shank thereof against tongues bent from the shank to form a seal between the collar and shank and then vulcanizing a rubber cup over the tongues and enlargement, in such a manner that the rubber of the cup completely envelopes one side and the periphery of the enlargement and tongues and firmly anchors the cup to the shank to prevent the fused rubber of the cup flowing down the shank.

2. A method of fastening flexible rubber cups to dental polishing shanks having split tongues, consisting in fitting a partially cured rubber collar on the shank against one side of the tongues and then vulcanizing the cup over the tongues and collar for embedding the same in the body of the cup with one side of the collar exposed.

3. The method of producing dental polishing cups of vulcanizable material having a metal shank with tongues at one end thereof, consisting in mounting a partially vulcanized rubber ring on the shank adjacent certain of the tongues and mounting the shank in a mold with a cavity into which the tongues and ring project so that they are spaced from the surrounding wall and the ring in contact with the base of the cavity and then compressing and vulcanizing the cup of vulcanizable material over the same so as to entirely embed the tongues and top and outside of the ring whereby the ring forms a seal between the base and shank to prevent the fused rubber flowing down the shank.

4. The method of producing dental polishing cups of vulcanizable material having a metal shank with tongues at one end thereof, consisting in fitting a partially vulcanized rubber ring on the shank adjacent certain of the tongues and mounting the shank in a mold with a cavity into which the tongues and ring project so that the tongues and ring are spaced from the lateral wall and the ring against the base of the cavity and then compressing and vulcanizing the cup of vulcanizable material over the same to press the ring against the bottom of the cavity to form a seal and prevent the fused rubber of the cup flowing down the shank, for sufficient time to cause fusion and joining of the cup body and collar into a single mass of soft rubber completely covering the top and outside of the collar.

5. The method of making dental polishing cups of rubber having a shank consisting in mounting partially vulcanized rubber collar on the shank adjacent one end and holding the collar against displacement from said end and then molding and vulcanizing a rubber cup on the shank over the collar to form a homogeneous mass fused with the collar.

6. A method of fastening cups of vulcanizable material to dental polishing shanks consisting in fitting a partially vulcanized soft rubber collar on the shank to form a seal therebetween and then vulcanizing the cup over the collar, for entirely embedding the same in the body of the cup with the bottom of the collar exposed.

7. The method of producing dental polishing tools consisting in providing a shank with a bore in one end to form a tubular portion at said end, splitting the tubular portion longitudinally to form tongues, bending certain of the tongues back on themselves in curved formation substantially normal to the axis of the shank, bending the other tongues outwardly in slightly divergent relation, fitting a partially vulcanized rubber collar on the shank against the tongues, mounting the shank with the collar thereon in a mold cavity so that the collar engages the bottom of the cavity to form a seal therebetween and between the shank and collar, and then compressing and vulcanizing a crude rubber body in the cavity around and over the collar to fuse therewith and form a single homogeneous flexible rubber cup.

GEORGE A. CHOTT.